Sept. 23, 1969  E. D. COTTA ET AL  3,468,237

EXPOSURE CONTROL APPARATUS

Original Filed Feb. 3, 1965  3 Sheets-Sheet 1

INVENTORS
Ezio D. Cotta
and
Vernon E. Ford
BY Brown and Mikulka
and
Charles J. McInure
ATTORNEYS Sept. 23, 1969    E. D. COTTA ET AL    3,468,237
EXPOSURE CONTROL APPARATUS Original Filed Feb. 3, 1965    3 Sheets-Sheet 2

INVENTORS
Ezio D. Cotta
and
Vernon E. Ford
BY Brown and Mikulka
and
Charles J. McGuire
ATTORNEYS

United States Patent Office 3,468,237
Patented Sept. 23, 1969

3,468,237
EXPOSURE CONTROL APPARATUS
Ezio D. Cotta, Dorchester, and Vernon E. Ford, West Hanover, Mass., assignors to Polaroid Corporation, Cambridge, Mass., a corporation of Delaware
Continuation of application Ser. No. 429,988, Feb. 3, 1965. This application Jan. 4, 1968, Ser. No. 695,803
Int. Cl. G03b 9/14
U.S. Cl. 95—63         6 Claims

ABSTRACT OF THE DISCLOSURE

This disclosure depicts an exposure control mechanism for a photographic camera, and more particularly, an iris-type mechanism capable of performing conjointly the functions of a shutter and a variable diaphragm.

CROSS REFERENCE TO RELATED APPLICATION

This application is a continuation of copending application of Ezio D. Cotta and Vernon E. Ford, Ser. No. 429,988, filed Feb. 3, 1965, now abandoned.

Many photographic cameras have been constructed with shutter and/or diaphragm systems of the type which have come to be known as the "iris" type. These mechanisms employ a plurality of blades which are moved in unison and symmetrically with respect to the optical axis of the camera for the purpose of defining a substantially circular aperture. One of the most commonly used means of moving the blades is to mount one or more rings for rotation about the optical axis and provide a movable pivot for each of the blades on the ring and a fixed pivot at another point spaced from both the movable pivot and the optical axis. The fixed pivot may be provided on a fixed portion of the camera, such as the shutter base plate, or on a second ring which is fixed in position while the first-mentioned ring is rotated. In the former case, the single ring may be rotated in one direction to move the blades to a given position and then counter-rotated to return the blades to their original position. In the latter case the first ring may be rotated while the second ring is held stationary to move the blades to a given position; the blades may then be returned to the original position by holding the first ring stationary and rotating the second ring in the same direction and by the same angular amount as the first ring was rotated.

The present invention is directed to an exposure control device of the iris type wherein two rings of the aforementioned type are used to effect movement of the blades. A single set of blades is provided for opening and closing movement to allow the passage of a predetermined amount of light for exposing a photosensitive film. By movement of the usual manually engageable shutter release means the device is brought from a rest to a cocked or tensioned position and released for movement to effect an exposure. Means are provided to cause rotating movement of one of the rings, upon release thereof from the tensioned position, while the second ring is held stationary, thereby moving the blades to an open or exposure position. The second ring is subsequently rotated, in the same direction as the first and by an equal angular distance, after the first ring has been stopped and held stationary, to move the blade back to the closed position, thus terminating the exposure.

It is a principal object of the present invention to provide a novel and improved exposure control device of the iris type having a single set of blades movable between open and closed positions by sequential rotation of a pair of rings upon which the blades are mounted and included means for adjustably controlling the exposure value without employing the usual escapement mechanism.

A further object is to provide an iris type exposure control device comprising a plurality of blades moved cooperatively by a pair of rotatable rings and having a single setting member for adjusting the exposure value by cooperatively adjusting the effective exposure aperture and shutter speed.

Another object is to provide an exposure control device of the aforementioned type having a mechanism which allows cocking or tensioning of the device and movement thereof to effect an exposure by manual movement of a release member, and further including means permitting movement of the release member back to the rest position without effecting an exposure, if desired.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The exposure control device of the invention is, of course, intended to be incorporated in the structure of a photographic camera to effect exposure of a photosensitive film mounted within the camera in the usual manner. The side of the device shown in FIGS. 3–6 is that which normally faces the camera in the illustrated embodiment and is therefore termed the rear side of the device. It is to be understood, however, that it would be possible to construct the device for mounting with either side facing the camera, the term being used merely for convenience. Terms such as "clockwise," "counterclockwise," "upward," etc., are used throughout the following disclosure to describe movement of the various elements as seen in FIGS. 3–6, and are not intended in a limiting sense.

Figure 1:
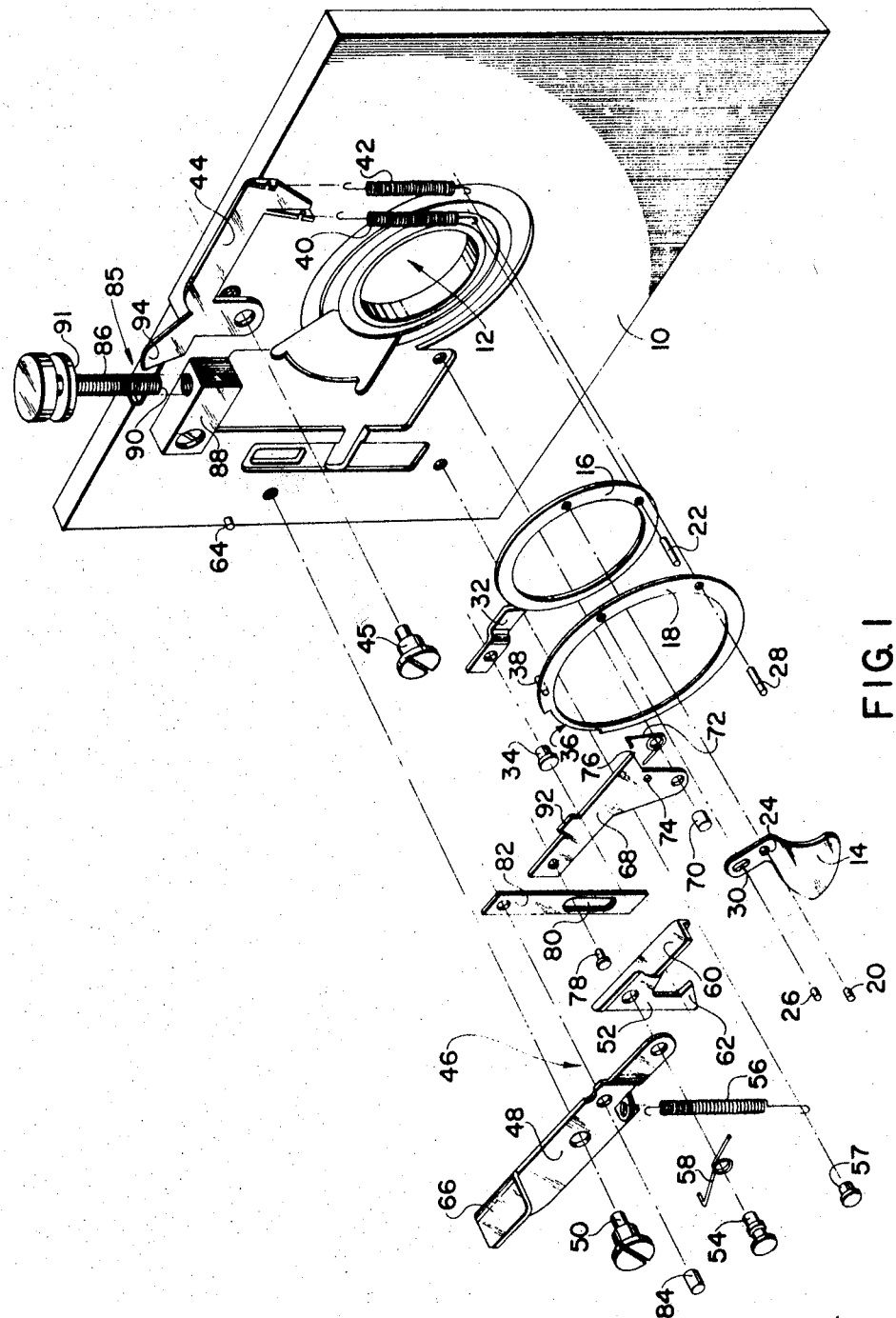
FIGURE 1 is an exploded, perspective view of one embodiment of an exposure control device embodying the present invention.

Referring now to the drawings, the elements are mounted upon a suitable support or base plate 10 having opening 12 therethrough. Base plate 10 is suitable for mounting in a conventional camera shutter housing which carries the usual objective lens system in optical alignment with opening 12, or base plate 10 may itself be adapted to serve as the lens board and be mounted directly on the camera front. A plurality of blades 14 (only one being shown in FIGURE 1) are mounted for covering and uncovering movement with respect to opening 12 in a manner described later in more detail. Blades 14 are of conventional construction, usually formed of a thin metal, as associated with many shutters and diaphragm mechanisms of the iris type.

Inner ring 16 and outer ring 18 are mounted for reciprocal, rotating movement upon base plate 10 about the optical axis of the camera, which may be assumed for present purposes to pass through the center of opening 12. Suitable recesses or annular guides are provided on base plate 10 to retain and control movement of rings 16 and 18. Fixed studs 20, one of which is somewhat elongated and designated as first control stud 22, pass from inner ring 16 through openings 24 in blades 14. Likewise, fixed studs 26 and elongated second control stud 28 pass from outer ring 18 through openings 30 in blades 14. It may thus be seen that if one of rings 16 and 18 is held stationary as the other is rotated, the studs on the stationary ring will act as pivotal mountings for blades 14 which will thus be rotated about said pivotal mountings by movement of the studs on the moving ring. However, if both rings are moved simultaneously through the same angle and in the same direction, blades 14 will move therewith about the axis of rotation of the rings but will not move in a covering or uncovering manner with respect to opening 12.

Figure 2:
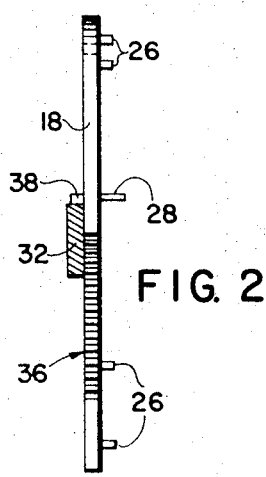
FIG. 2 is a fragmentary, side view of certain elements of the device of FIGURE 1 in section on the line 2—2 of FIG. 3.

Extending radially outward from inner ring 16 is arm 32 having pin 34 extending therefrom. Arm 32 extends under outer ring 18 which includes on a portion of the outer periphery thereof a plurality of closely-spaced notches or serrations 36, and fixed pin 38, extending from the opposite side of ring 18 from studs 26, as best seen in FIG. 2. Springs 40 and 42 are attached at one end to control studs 22 and 28, respectively, and at the other end to one end of arm 44 which is pivotally mounted upon pin 45 which extends from base plate 10. As explained more fully later, the position of arm 44 with respect to control studs 22 and 28 may be adjusted to change the amount of tension in springs 40 and 42. Thus, springs 40 and 42 will tend to rotate rings 16 and 18, respectively, in a counterclockwise direction. Movement of inner ring 16 in the counterclockwise direction is limited by contact of arm 32 with an element described hereinafter, which thus defines what is termed the "rest" position of ring 16. Movement of outer ring 18 in the counterclockwise direction is limited by contact of fixed pin 38 with arm 32, which thus defines the rest position of ring 18. Blades 14 are so constructed and arranged on studs 20, 22, 26 and 28 that when rings 16 and 18 are in their rest positions, as just defined, blades 14 are in completely covering relationship to opening 12, thus preventing passage of light therethrough, as shown in FIG. 3.

A "cocking and release" linkage, designated generally by the reference numeral 46, is provided and includes manually engageable lever 48, pivotally mounted on base plate 10 by means of pin 50, and crank arm 52, pivotally mounted on the end of lever 48 by pin 54. Lever 48 is biased toward movement in a clockwise direction about its pivotal mounting on pin 50 by spring 56, attached at one end to lever 48 and at the other end to pin 57 extending fixedly from base plate 10. Crank arm 52 is biased toward movement in a counterclockwise direction about pin 54 by spring 58. Crank arm 52 includes at one end tab 60, presenting an upwardly disposed surface, and at the other end hook 62 which is adapted to engage pin 34 on arm 32 of inner ring 16. Movement of lever 48 in the clockwise direction is limited by contact thereof with fixed stop 64 extending from base plate 10; in this position of lever 48, hook 62 is in engaging relation with pin 34, thus defining the rest position of cocking and release linkage 46.

Figure 3:
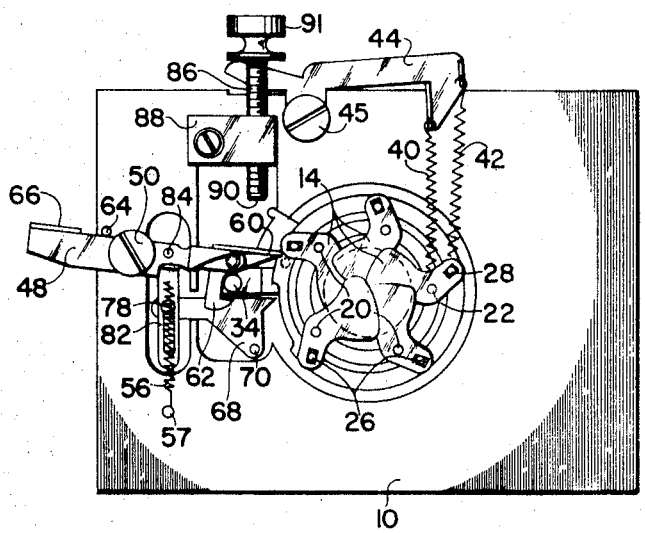
FIGS. 3–6 are a series of rear elevational views of the device showing the elements thereof in various positions of movement.
Figure 4:
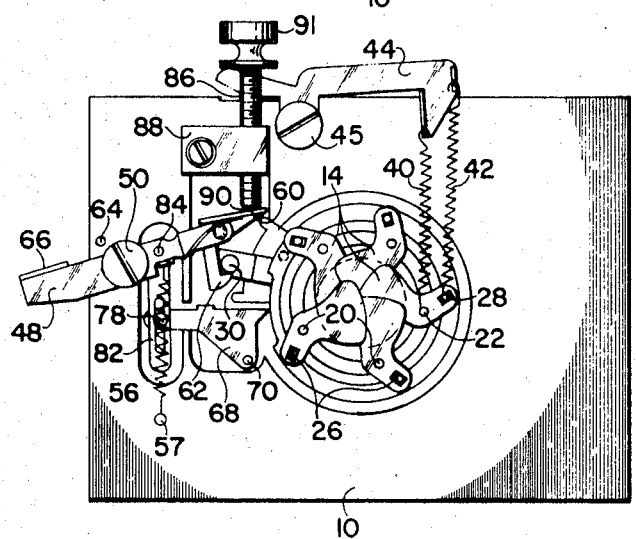

The elements of the device are shown in FIG. 3 in the rest position, prior to initiating any movement to effect an exposure. All elements having a spring bias thereon are moved to the full extent permitted by the fixed stops limiting movement thereof in the direction of the biasing force. In order to effect an exposure the operator depresses manually engageable portion 66 of lever 48, which may be seen to extend past the edge, and thus past the enclosed portion, of base plate 10. In so doing, lever 48 is rotated in a counterclockwise direction, against the bias of spring 56, and crank arm 52 is moved in a generally upward direction. Since hook 62 engages pin 34, inner ring 16 is rotated in a clockwise direction, as is outer ring 18 due to contact of arm 32 of the inner ring with fixed pin 38 of the outer ring. Thus, inner ring 16 and outer ring 18 are moved together, with no relative movement between the two, from the rest position of FIG. 3 to the position of FIG. 4, wherein springs 40 and 42 are under greater tension than in FIG. 3; the positions of the elements shown in FIG. 4 are hereafter termed the "tensioned" positions.

Catch 68 is pivotally mounted on pin 70 extending from base plate 10 and is biased for movement in a clockwise direction by spring 72, which is anchored at one end against a portion of the base plate, passes around pin 70 and extends through hole 74 in catch 68. Catch 68 includes sharp nose portion 76, adapted to engage in notches 36 of outer ring 18, and pin 78, which extends slidably through slot 80 in element 82. The latter element is pivotally attached by means of pin 84 to lever 48. As outer ring 18 is rotated to its tensioned position, nose portion 76 of catch 68 rides along the portion of the outer periphery of the ring including notches 36. Due to the location of the pivotal mounting of catch 68, ring 18 may be rotated in a clockwise direction to the tensioned position, but rotation in a counterclockwise direction once the ring has reached the tensioned position will be prevented by nose portion 76 of the catch engaging the adjacent notch in the periphery of the ring.

When the elements reach the tensioned position tab 60 of crank arm 52 engages an adjustable stop, denoted generally by the numeral 85, positioned in the path of movement of the tab. In the present description the adjustable stop is shown as comprising screw 86 threaded into fixed block 88 on base plate 10 and presenting free end 90 for contact by tab 60. Screw 86 also includes head 91, extending past the edge of base plate 10 for manual engagement to adjust the position of the screw. It will be readily understood that the adjustable stop may take a variety of other forms and the position thereof may be adjusted or set by manually or automatically operable means, or a combination of the two. A more detailed explanation of nature of the adjustable stop and the effect on exposure of particular settings thereof will be supplied after the operation of the device has been explained more fully.

Further movement of lever 48 in a counterclockwise direction after tab 60 engages free end 90 of screw 86 will produce clockwise rotation of crank arm 52 about pin 54. Hook 62 will thus be removed from engagement with pin 34 and inner ring 16 will be free to rotate, under the bias of spring 40, back to the rest position. Outer ring 18 is no longer retained in the tensioned position by engagement of fixed pin 38 thereon with arm 32 of inner ring 16, but nose portion 76 of catch 68 will engage one of notches 36, as previously mentioned, and retains the outer ring in the tensioned position. Movement of inner ring 16 with outer ring 18 held stationary will rotate blades 14 about studs 26 to an uncovering position with respect to at least a portion of opening 12, as shown in FIG. 5, this position being termed the "exposure" position.

When inner ring 16 moves from the tensioned to the exposure position, under the force exerted by spring 40 on first control stud 22, the end portion of arm 32 will engage contact portion 92 of catch 68. The impulse applied by arm 32 will rotate catch 68 in a counterclockwise direction, thereby removing nose portion 76 from engagement with one of notches 36. Outer ring 18 will then be free to rotate in a counterclockwise direction under the force exerted by spring 42 on second control stud 28. Since inner ring 16 has already rotated to the full extent permitted by contact of arm 32 with contact portion 92, outer ring 18 will move relative thereto, causing blades 14 to rotate about studs 20 back to the closed position with respect to opening 12. Spring 56 will return cocking and release linkage 46 to the position of FIG. 3 when manual pressure is released from portion 66 of lever 48. Arm 52 is rotated in a clockwise direction as hook 62 passes pin 34 and is returned to engaging relation with respect to the pin by spring 58. Thus, the elements are returned to the rest position and a subsequent exposure may be effected in the same manner.

It will be noted that end 94 of arm 44 is positioned under head 91 of screw 86, whereby movement of the screw will cause arm 44 to rotate about pin 45, thus changing the tension in the rest position of springs 40 and 42. If head 91 is lowered by threading screw 86 further into block 88 the tension will be increased. Conversely, if head 91 is raised the tension in springs 40 and 42 will be decreased since the end of arm 44 to which the springs are attached may move closer to control studs 22 and 28 to which the other ends of the springs are attached. Movement of screw 86 will also serve to alter the amount of rotation of rings 16 and 18 in moving between the rest and tensioned positions. When inner ring 16 is released and moves to the exposure position, the amount of angular movement thereof (being the same, of course, as that in moving from the rest to the tensioned position) will determine the extent of movement of blades 14, and hence the size of the aperture defined thereby in the exposure position. The speed of the blades in moving to the open position will be determined by the tension in spring 40, and the speed in closing by the tension in spring 42. Since the tension in both springs is determined by the position of arm 44, which in turn is determined by the position of screw 86, it is apparent that both the amount of opening of the blades and the speed of movement thereof (i.e., the exposure value) will be determined by the setting of the adjustable stop.

Figure 5:
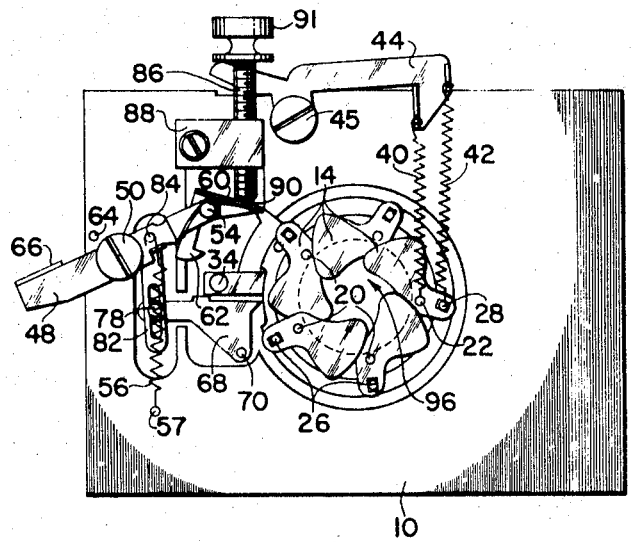
Figure 6:
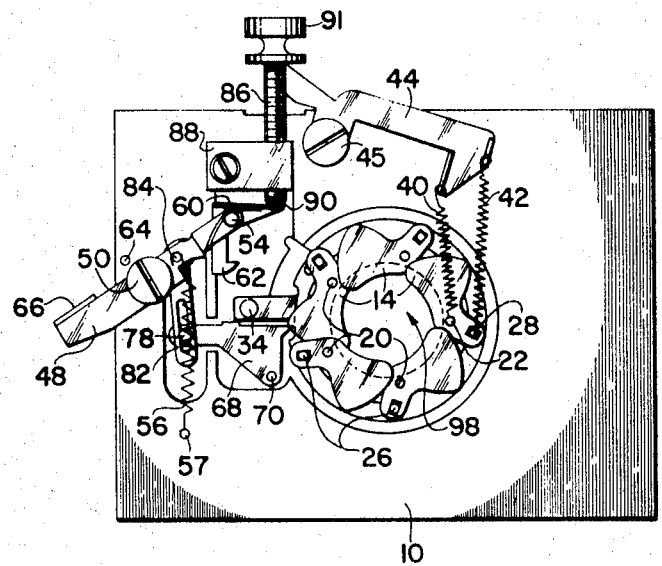

A comparison of FIGS. 5 and 6 illustrates the difference in movement of the blades caused by a change in the setting of the adjustable stop. In FIG. 5, free end 90 of screw 86 is positioned for contact by tab 60 of crank arm 52 after a relatively short movement thereof from the rest position, whereas the crank arm must be moved somewhat farther before contacting end 90 in the position thereof shown in FIG. 6. Therefore, the angular rotation of inner ring 16 in moving from the tensioned to the exposure position is less when screw 86 is positioned as in FIG. 5 than when positioned as in FIG. 6. Since outer ring 18 is held stationary by engagement of nose portion 76 in one of notches 36 as inner ring 16 moves from the tensioned to the exposure position, the amount of opening movement of blades 14 is directly controlled by the amount of movement of inner ring 16. In FIGS. 5 and 6, blades 14 have reached the maximum extent of their opening movement and are shown just prior to movement of outer ring 18 to begin the closing movement. The aperture defined by the blades in the FIG. 5 position, designated by the numeral 96, may be seen to be considerably smaller than the aperture defined by the blades in the FIG. 6 position, designated by the numeral 98.

It may also be seen from a comparison of FIGS. 5 and 6 that the position of the end of arm 44 to which springs 40 and 42 are attached has been changed by movement of screw 86. It is further apparent that tension in the springs when the elements are moved to the tensioned position will be affected by the amount of movement of control studs 22 and 28 from the rest to the tensioned position since the end of arm 44 to which the springs are attached is fixed during the exposure operation, i.e., once the desired setting of screw 86 has been made. The speed of movement of the blades between the open and closed positions is in proportion to the length of (or amount of tension in) springs 40 and 42 in the tensioned position which is, in view of the above explanation, a function of the setting of adjustable stop 85.

The arrangement of arm 44 with respect to screw 86 provides a cooperative adjustment of maximum aperture size and blade speed in a manner which increases the range of exposure values obtainable with the device. That is, as the screw is moved upward to provide a larger aperture, the end of arm 44 to which springs 40 and 42 are attached is moved downward, or closer to control studs 22 and 28, with consequent shortening of the spring length in the rest position. Of course the control studs are moved farther from the rest to the tensioned position when the screw is adjusted to make the aperture size larger so the length of the springs in the tensioned position may remain the same as before the adjustment. For example, if springs 40 and 42 were attached to fixed pins on base plate 10, as the aperture were adjusted to a larger size the increase in the distance of travel of the control studs would result in a faster blade speed which would tend to keep the exposure value constant.

The relationship between aperture size and blade speed is a function of the ratio of movement of free end 90 of screw 86 to that of the end of arm 44 to which springs 40 and 42 are attached. This may be controlled in several ways, of course, as by providing variable cam means between screw 86 and arm 44, or by the location of pin 45 along the arm. In the illustrated embodiment, for example, the location of pin 45 provides for a ratio of about 2 to 1 between the opposite ends of arm 44. Therefore, as screw 86 is moved upward by a given distance to provide a larger aperture, the end of arm 44 to which the springs are attached is moved downward by about twice that distance so that the springs will be even shorter in the tensioned position than before movement of the screw in spite of the greater travel of the control studs. Thus, as the aperture gets larger the blade speed gets slower, thereby effecting a greater change in the exposure value. The "program" of the device, i.e., the exposure value which results for each given setting of the adjustable stop, is also a function of the rate of springs 40 and 42, and their length in the rest position. Arm 44 may easily be provided with a plurality of attaching means for the springs, each spaced a different distance from the control studs. The relationship between aperture size and blade speed for a particular setting of the adjustable stop could then be changed by attaching the springs to a different attaching means.

Figure 7:
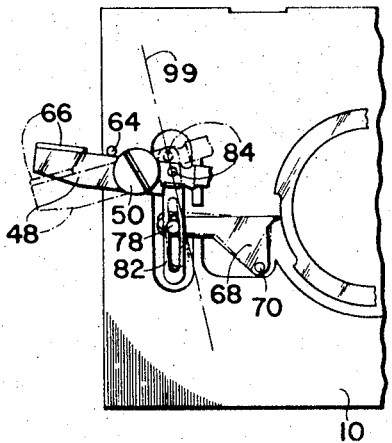
FIGS. 7 and 8 are fragmentary, elevational views illustrating the operation of a portion of the device.
Figure 8:
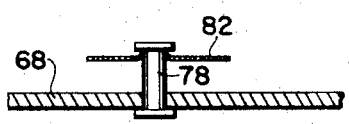

In FIGS. 7 and 8 are shown more clearly the interconnection between release lever 48 and catch 68. The rest position of the elements is shown in solid lines in FIG. 7 and an illustrative tensioned position in dot-dash lines. Rivet 78 is affixed to catch 68 and is frictionally engaged by the sides of slot 80 in element 82, as best shown in FIG. 8. Thus, as element 82 moves with release lever 48, rivet 78 may slide up and down slot 80, but this movement transmits a force to catch 68 due to the frictional engagement of the rivet in the slot. Pin 84, by means of which element 82 is pivotally attached to lever 48, is preferably so arranged with respect to pin 78 that throughout the arc of movement of pin 84 pin 78 never crosses the line extending through the upper and lower positions of pin 84, this line being shown for illustrative purposes only and indicated by the reference numeral 99 in FIG. 7.

From the above explanation it may be seen that movement of lever 48 from the rest toward the tensioned position will exert a force on catch 68 tending to rotate the latter in a clockwise direction about its pivotal mounting on pin 70. This will urge nose portion 76 toward engagement with notches 36 in ring 18. Conversely, movement of lever 48 toward the rest position will tend to rotate catch 68 in a counterclockwise direction, thereby moving nose portion 76 out of engagement with notches 36. Without this arrangement, any movement of lever 48 away from the rest position would result in the blades opening even though the operator allowed lever 48 to return to the rest position without releasing hook 62 from pin 34 since nose portion 76 would engage one of notches 36 and prevent ring 18 from returning to the rest position. With the arrangement shown, catch 68 is rotated away from engagement with the notches as lever 48 is lowered, thereby allowing ring 18 to return to the rest position without opening the blades. This does not affect operation of the device for normal exposures since catch 68 may also be removed from engagement with notches 36 by impact of arm 32 on contact portion 92 of the catch.

The basic exposure control device described herein may easily be modified or further refined to provide a variety of operational characteristics. For example, an exposure meter could be incorporated and the exposure value adjusted in a semi-automatic manner as by attaching a needle to screw 86 to be matched with the needle of the exposure meter. Likewise, a known photometric device of the type having a reference brightness could be adjusted cooperatively with the adjustable stop of the exposure control device. Fully automatic setting of the adjustable stop could also be achieved by known means. A choice of programs, often desirable for automatic operation as when films of different sensitivities are to be exposed, could be provided by making the position of the pivot point of arm 44 selectively adjustable or through the use of various cam means between arm 44 and the adjusting means. The device may thus be seen to be extremely versatile as well as simple in both construction and operation.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. A photographic exposure control device comprising, in combination:
   (a) a base support having an exposure opening therethrough;
   (b) blade means movable between covering and uncovering positions with respect to said opening and for variably defining an exposure aperture;
   (c) a first member mounted for movement relative to said support;
   (d) a second member mounted for movement relative to said support, movement of said first member relative to said second member causing said blade means to uncover said opening and subsequent movement of said second member relative to said first member causing said blade means to cover said opening;
   (e) biasing means for urging said first and second members for movement from respective tensioned positions to respective rest positions;
   (f) cocking means for advancing said first and second members from said respective rest positions to said respective tensioned positions;
   (g) release means for releasing said first member at its tensioned position for movement under the influence of said biasing means, said release means including adjustable means for varying said tensioned position at which said first member is released in accordance with a selected maximum effective aperture to be defined by said blade means during exposure;
   (h) means for retaining said second member in a stationary position during movement of said first member, whereby relative movement is produced between said first and second members to cause said blade means to uncover said opening;
   (i) means for arresting movement of said first member at its rest position, said blade means defining said selected maximum effective aperture when said first member has moved to its rest position;
   (j) means for releasing said retaining means in response to arrest of movement of said first member to permit movement of said second member under the influence of said biasing means, whereby said blade means covers said opening; and
   (k) variable means for varying the tension of said biasing means in coordination with adjustments of said adjustable means such that changes in the said selected maximum effective aperture and in the exposure interval are effected conjointly.

2. A photographic exposure control device comprising, in combination:
   (a) a base support having an exposure opening therethrough;
   (b) a plurality of blades movable between covering and uncovering positions with respect to said opening to effect an exposure;
   (c) a first ring rotatably mounted upon said support and having thereon a first pivotal mounting for each of said blades;
   (d) a second ring rotatably mounted upon said support coaxially with said first ring and having thereon a second pivotal mounting for each of said blades, whereby rotation in a first direction of said first ring relative to said second ring produces pivotal movement of said blades to said open position and subsequent rotation of said second ring relative to said first ring in said first direction produces pivotal movement of said blades to said closed position;
   (e) biasing means for urging said rings toward rotation in said first direction;
   (f) cocking means for rotating said first and second rings in a second direction opposite to said first direction from respective angular rest positions to respective angular tensioned positions;
   (g) manually operable release means for releasing said first ring at said angular tensioned position thereof for rotation in said first direction, said release means including adjustable means for varying said angular tensioned position at which said first ring is released in accordance with a selected maximum effective aperture to be defined by said blades during exposure;
   (h) catch means for retaining said second ring in a stationary position during movement of said first ring in said first direction, whereby relative movement is effected between said first and second rings and said blades are moved toward said open position;
   (i) contact means arranged for engagement by a portion of said first ring to limit movement thereof in said first direction at said rest position, said blades defining said selected maximum effective aperture;
   (j) means for releasing said catch means to allow rotation of said second ring in said first direction in response to engagement of said portion of said first ring with said contact means, whereby said blades are moved to said closed position; and
   (k) variable means for varying the tension of said biasing means in coordination with adjustment of said adjustable means such that changes in the said selected maximum effective aperture and in the exposure interval are effected conjointly.

3. The apparatus defined by claim 2 wherein said cocking means includes pivotable latch means for engaging said first ring to move said first and second rings to said angular tensioned position, and wherein said adjustable means includes trip means for tripping said latch means to free said first ring for rotation in said first direction at a particular angular tensioned position selectable in accordance with the desired maximum effective aperture to be defined by said blades during exposure.

4. The apparatus defined by claim 3 wherein said second ring includes angularly spaced engageable means thereon for engagement by said catch means at varying angular attitudes of said second ring dependent upon the particular tensioned position at which said first ring is released by said release means.

5. A photographic exposure control device comprising, in combination:
   (a) a base support having an exposure opening therethrough;
   (b) a plurality of blades movable between covering and uncovering positions with respect to said opening to effect an exposure;

(c) a first ring rotatably mounted upon said support and having thereon a first pivotal mounting for each of said blades;

(d) a second ring rotatably mounted upon said support coaxially with said first ring and having thereon a second pivotal mounting for each of said blades, whereby rotation in a first direction of said first ring relative to said second ring produces pivotal movement of said blades to said open position and subsequent rotation of said second ring relative to said first ring in said first direction produces pivotal movement of said blades to said closed position;

(e) biasing means for urging said rings toward rotation in said first direction;

(f) cocking means for rotating said first and second rings in a second direction opposite to said first direction from respective angular rest positions to respective angular tensioned positions, said cocking means including pivotable latch means for engaging said first ring to move said first and second rings to said respective angular tensioned positions;

(g) manually operable release means for releasing said first ring at said angular tensioned position thereof for rotation in said first direction, said release means including adjustable means for varying said angular tensioned position at which said first ring is released in accordance with a selected maximum effective aperture to be defined by said blades during exposure, said adjustable means including trip means for tripping said latch means to free said first ring for rotation in said first direction at a particular angular tensioned position selectable in accordance with the desired maximum effective aperture to be defined by said blades during exposure;

(h) catch means for retaining said second ring in a stationary position during movement of said first ring in said first direction, whereby relative movement is effected between said first and second rings and said blades are moved toward said open position;

(i) contact means arranged for engagement by a portion of said first ring to limit movement thereof in said first direction at said rest position, said blades defining said selected maximum effective aperture; and (j) means for releasing said catch means to allow rotation of said second ring in said first direction in response to engagement of said portion of said first ring with said contact means whereby said blades are moved to said closed position.

6. A photographic exposure control device comprising, in combination:

(a) a base support having an exposure opening therethrough;

(b) a plurality of blades movable between covering and uncovering positions with respect to said opening to effect an exposure;

(c) a first ring rotatably mounted upon said support and having thereon a first pivotal mounting for each of said blades;

(d) a second ring rotatably mounted upon said support coaxially with said first ring and having thereon a second pivotal mounting for each of said blades, whereby rotation in a first direction of said first ring relative to said second ring produces pivotal movement of said blades to said open position and subsequent rotation of said second ring relative to said first ring in said first direction produces pivotal movement of said blades to said closed position;

(e) biasing means for urging said rings toward rotation in said first direction;

(f) cocking means for rotating said first and second rings in a second direction opposite to said first direction from respective angular rest positions to respective angular tensioned positions;

(g) manually operable release means for releasing said first ring at said angular tensioned position thereof for rotation in said first direction, said release means including adjustable means for varying said angular tensioned position at which said first ring is released in accordance with a selected maximum effective aperture to be defined by said blades during exposure;

(h) catch means for retaining said second ring in a stationary position during movement of said first ring in said first direction, whereby relative movement is effected between said first and second rings and said blades are moved toward said open position;

(i) contact means arranged for engagement by a portion of said first ring to limit movement thereof in said first direction at said rest position, said blades defining said selected maximum effective aperture; and (j) means for releasing said catch means to allow rotation of said second ring in said first direction in response to engagement of said portion of said first ring with said contact means, whereby said blades are moved to said closed position, said second ring including angularly spaced engageable means thereon for engagement by said catch means at different angular attitudes of said second ring dependent upon the particular tensioned position at which said first ring is released by said release means.

References Cited

UNITED STATES PATENTS 3,165,996   1/1965   Kiper.

JOHN M. HORAN, Primary Examiner